(12) United States Patent
Takeo et al.

(10) Patent No.: US 7,578,374 B2
(45) Date of Patent: Aug. 25, 2009

(54) DISK BRAKE DEVICE

(75) Inventors: Yuichi Takeo, Toyota (JP); Takahiro Ito, Chiryu (JP); Junichi Takeuchi, Nagoya (JP)

(73) Assignee: Advics Co., Ltd., Kariya-Shi, Aichi-Ken (JP)

( * ) Notice: Subject to any disclaimer, the term of this patent is extended or adjusted under 35 U.S.C. 154(b) by 368 days.

(21) Appl. No.: 11/484,712

(22) Filed: Jul. 12, 2006

(65) Prior Publication Data

US 2007/0017756 A1 Jan. 25, 2007

(30) Foreign Application Priority Data

Jul. 19, 2005 (JP) ............................. 2005-208863
Jul. 19, 2005 (JP) ............................. 2005-208864

(51) Int. Cl.
F16D 65/40 (2006.01)
(52) U.S. Cl. ............... 188/73.38; 188/73.39; 188/73.31
(58) Field of Classification Search ............... 188/71.1, 188/73.1, 73.31, 73.35, 73.36, 73.37, 73.38, 188/73.39, 250 B, 250 F, 250 R
See application file for complete search history.

(56) References Cited

U.S. PATENT DOCUMENTS 5,323,882 A * 6/1994 Waterman et al. .......... 188/73.1
5,467,846 A * 11/1995 Abe et al. ................ 188/73.37
7,201,257 B2 * 4/2007 Nakajima et al. ........ 188/73.38

FOREIGN PATENT DOCUMENTS

| EP | 27714 A1 | * 4/1981 |
| JP | 53127972 A | * 11/1978 |
| JP | 56086244 A | * 7/1981 |
| JP | 2005-121051 | 5/2005 |
| JP | 2005-121193 | 5/2005 |

* cited by examiner

*Primary Examiner*—Thomas J Williams
(74) *Attorney, Agent, or Firm*—Buchanan Ingersoll & Rooney PC

(57) ABSTRACT

A disk brake has a mount and a pad. The pad has a guide portion and outer and inner push bearing portions on a disk rotor rotation outlet side. The mount has a support portion to support the guide portion movably in a rotor axial direction. The outer and inner push bearing portions are provided on each position outwardly or inwardly of the rotor rotation outlet side guide portion in the radial direction of the rotor, and project toward the mount in the radial direction of the rotor to abut against the mount. The outer push bearing portion has an abutment surface to abut against the mount on a tangent to an outer peripheral side in a central position of the outer peripheral side of a friction surface of the pad radially outwardly in the radial direction of the rotor, or in a position outwardly of the tangent.

16 Claims, 10 Drawing Sheets

DISK BRAKE DEVICE

This application claims priority to Japanese patent application serial numbers 2005-208863 and 2005-208864, the contents of which are incorporated herein by reference.

BACKGROUND OF THE INVENTION

1. Field of the Invention

The present invention relates to disk brakes. Specifically, the invention relates to disk brakes, in which guide portions are formed on both sides of a pad, and the guide portion are supported by supports formed on a mount to be movable in a rotor axial direction and prevented from coming off the mount in a radial direction of a rotor.

2. Description of the Related Art

Various disk brakes, for example, are described in JP-A-2005-121051 and JP-A-2005-121193.

These disk brakes include convex-shaped guide portions on both ends of a pad. The guide portions are supported by a pair of concave-shaped supports formed on a mount to be movable in a rotor axial direction and prevented from coming off the mount in a radial direction of a rotor. The pad has an outer push bearing portion and an inner push bearing portion on a rotor rotation outlet side edge. The outer push bearing portion of the pad abuts against the mount in a position outwardly of the guide portion in the radial direction of the rotor, and an inner push bearing portion of the pad abuts against the mount in a position radially inwardly of the guide portion in the radial direction of the rotor.

Accordingly, when the pad is pushed against a disk rotor and eager to rotate with the disk rotor, the pad abuts against the mount at two points on a rotor rotation outlet side edge thereof. Therefore, the pad is not inclined relative to the mount, so that it is possible to prevent the pad from twisting relative to the mount.

In the case where the pad is pushed against the disk rotor, however, a central position, in which push is made, becomes sometimes near not to a center of figure of the pad but to an end of the pad. Such phenomenon is liable to occur, for example, in the case where the pad wears locally and in the case where the pad is pushed toward the disk rotor with a light push force. In the case where such phenomenon occurs, a large torque is generated on the pad to incline the pad relative to the mount. Thus twist sometimes generates between the mount and the pad.

Thus, there is need in the art for a disk brake, in which a pad is difficult to incline relative to a mount and the pad is able to abut against the mount at two points on a rotor rotation outlet side edge thereof.

SUMMARY OF THE INVENTION

It is accordingly an object of the present invention to provide a disk brake in which it is difficult to incline a pad relative to a mount.

In one aspect of the present invention, a rotor rotation outlet side of the pad has an outer push bearing portion and an inner push bearing portion. The outer push bearing portion projects toward the mount from a position outwardly of a rotor rotation outlet side guide portion in the radial direction of the rotor to abut against the mount when the pad is moved in a direction of rotation of the rotor. The inner push bearing portion projects toward the mount from a position inwardly of the rotor rotation outlet side guide portion in the radial direction of the rotor to abut against the mount when the pad is moved.

Therefore, the rotor rotation outlet side of the pad will abut against the mount at two points.

In another aspect of the present invention, the outer push bearing portion has an abutment surface adapted to abut against the mount on a tangent to an outer peripheral side in a central position of the outer peripheral side of a friction surface of the pad radially outwardly in the radial direction of the rotor, or in a position outwardly of the tangent in the radial direction of the rotor.

Accordingly, even in the case where the center of the force to push the pad toward the disk rotor is close to the edge of the pad on the rotor rotation inlet side, inclination of the pad relative to the mount can be restricted by the outer push bearing portion. Therefore, the pad is able to abut against the mount at two points on the disk rotor rotation outlet side.

In another aspect of the present invention, the inner push bearing portion has an abutment surface adapted to abut against the mount on a tangent to an outer peripheral side in a central position of the outer peripheral side of a friction surface of the pad radially inward in the radial direction of the rotor, or in a position inwardly of the tangent in the radial direction of the rotor.

Accordingly, even in the case where the center of the force to push the pad toward the disk rotor is close to the edge of the pad on the rotor rotation outlet side, inclination of the pad relative to the mount can be restricted by the inner push bearing portion. Therefore, the pad is able to abut against the mount at two points on the disk rotor rotation outlet side.

In another aspect of the present invention, the mount has an outside projection and an inside projection. The outside projection projects toward the pad from a position outwardly of the support portion in the radial direction of the rotor to abut against the rotor rotation outlet side of the pad when the pad is moved in a direction of rotation of the rotor. The inside projection projects toward the pad from a position radially inwardly of support portion in the radial direction of the rotor to abut against the rotor rotation outlet side of the pad when the pad is moved.

Therefore, the mount is able to abut against the rotor rotation outlet side of the pad at two points.

In another aspect of the present invention, the outside projection has an abutment surface adapted to abut against the pad on a tangent to an outer peripheral side in a central position of the outer peripheral side of a friction surface of the pad radially outwardly in the radial direction of the rotor, or in a position outwardly of the tangent in the radial direction of the rotor.

Accordingly, even in the case where a center of a force to push the pad toward the disk rotor is close to an edge of the pad on the rotor rotation inlet side, inclination of the pad relative to the mount can be restricted by the outside projection. Therefore, the pad is liable to abut against the mount at two points on the disk rotor rotation outlet side.

In another aspect of the present invention, the inside projection has an abutment surface adapted to abut against the pad on a tangent to an outer peripheral side in a central position of the outer peripheral side of a friction surface of the pad radially inward in the radial direction of the rotor, or in a position inwardly of the tangent in the radial direction of the rotor.

Accordingly, even in the case where a center of a force to push the pad toward the disk rotor is close to an edge of the pad on the rotor rotation outlet side, inclination of the pad relative to the mount can be restricted by the inside projection. Therefore, the pad is able to abut against the mount at two points on the disk rotor rotation outlet side.

In addition, "rotor rotation inlet side" described in the claims and the specification means a side, to which a disk rotor enters at the time of forward travel of a vehicle, and "rotor rotation outlet side" means a side, from which a disk rotor emerges at the time of forward travel of a vehicle.

DETAILED DESCRIPTION OF THE INVENTION

Figure 1:
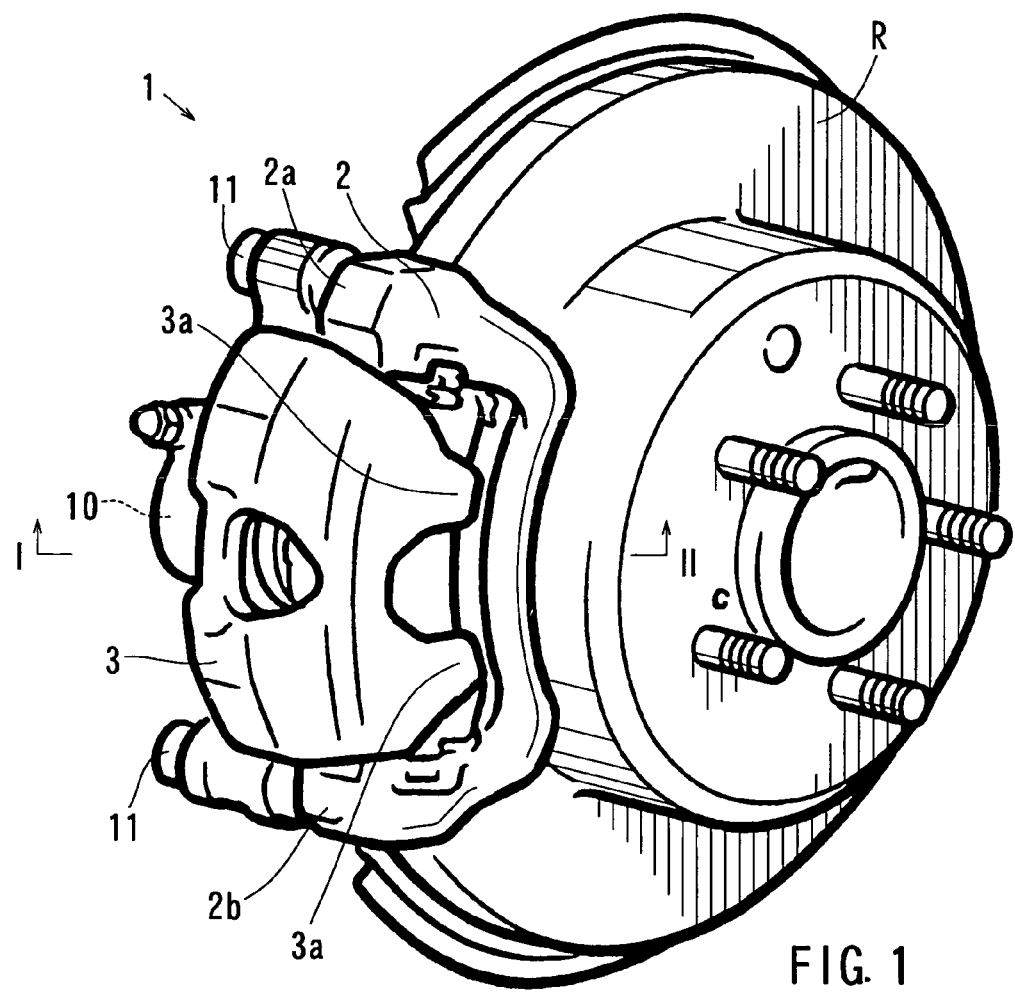
FIG. 1 is a perspective view of a disk brake according to a first representative embodiment of the present invention.

Each of the additional features and teachings disclosed above and below may be utilized separately or in conjunction with other features and teachings to provide improved disk brake devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A first representative embodiment of the present invention will now be described with reference to FIGS. 1 to 4. A disk brake 1 is a floating type disk brake as shown in FIGS. 1 and 2, and comprises a mount 2 fixed to a member on a vehicle side, a caliper 3 mounted to be movable relative to the mount 2, and a pair of pads 6, 6.

The caliper 3 is mounted by slide pins 11, 11 to be movable relative to the mount 2 in an axial direction of a disk rotor R. As shown in FIG. 2 the caliper 3 has a cylinder portion 3b in an inner side (left) and has pawls 3a, 3b on an outer side (right), and a piston 10 is inserted into the cylinder portion 3b.

The piston 10 pushes the inner side pad 6 against a disk rotor R. Then a reaction force against such push moves the caliper 3 toward the inner side (a left direction in FIG. 2) and the pawls 3a, 3a of the caliper 3 push the outer side pad 6 against the disk rotor R.

Figure 2:
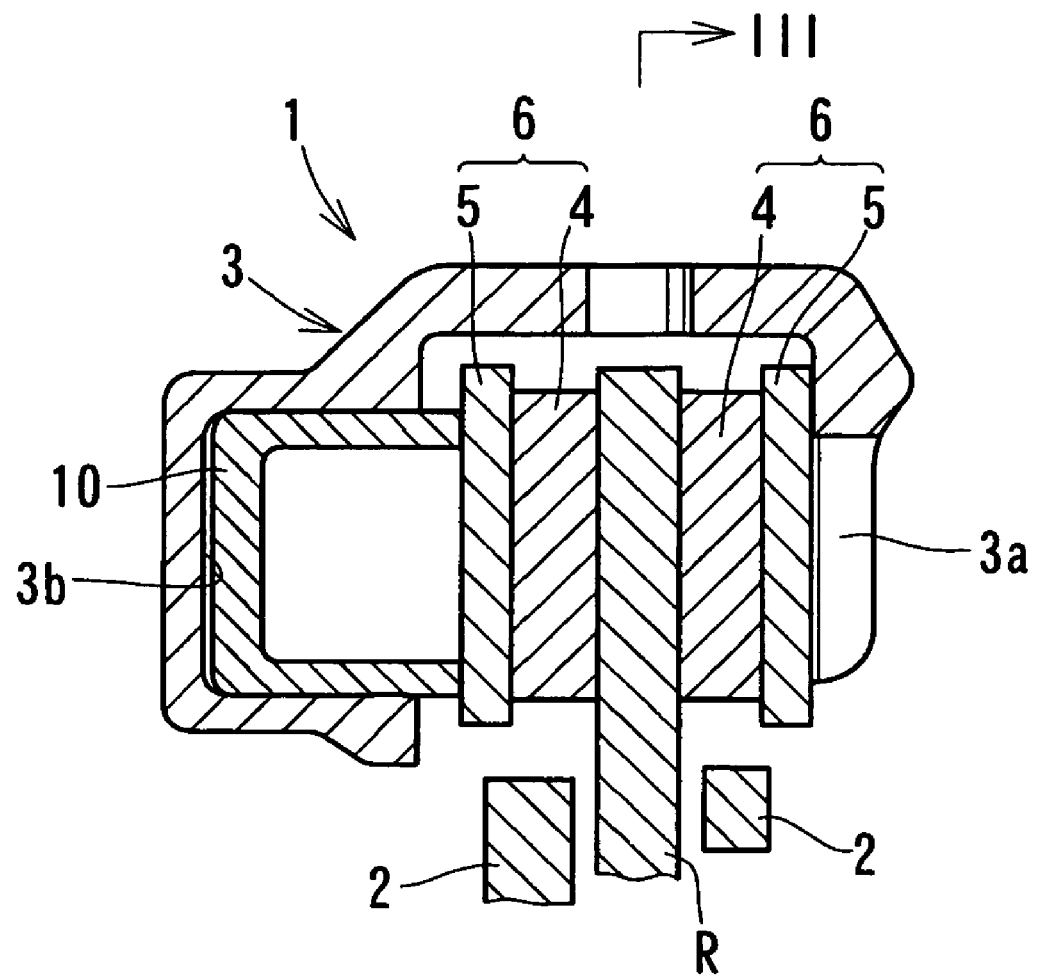
FIG. 2 is a cross-sectional view taken along line II-II in FIG. 1.

As shown in FIG. 1 the mount 2 comprises a pair of straddle portions 2a, 2b to straddle the disk rotor R in the axial direction of the rotor. A pair of outer torque receive portions extend from outer side edges of the straddle portions 2a, 2b, and a pair of inner torque receive portions extend from inner side edges of the straddle portions 2a, 2b. Each of the torque receiving portions includes support portion (2a1 or 2b1), outer torque bearing surface (2a2 or 2b2), and inner torque bearing surface (2a3 or 2b3).

Figure 3:
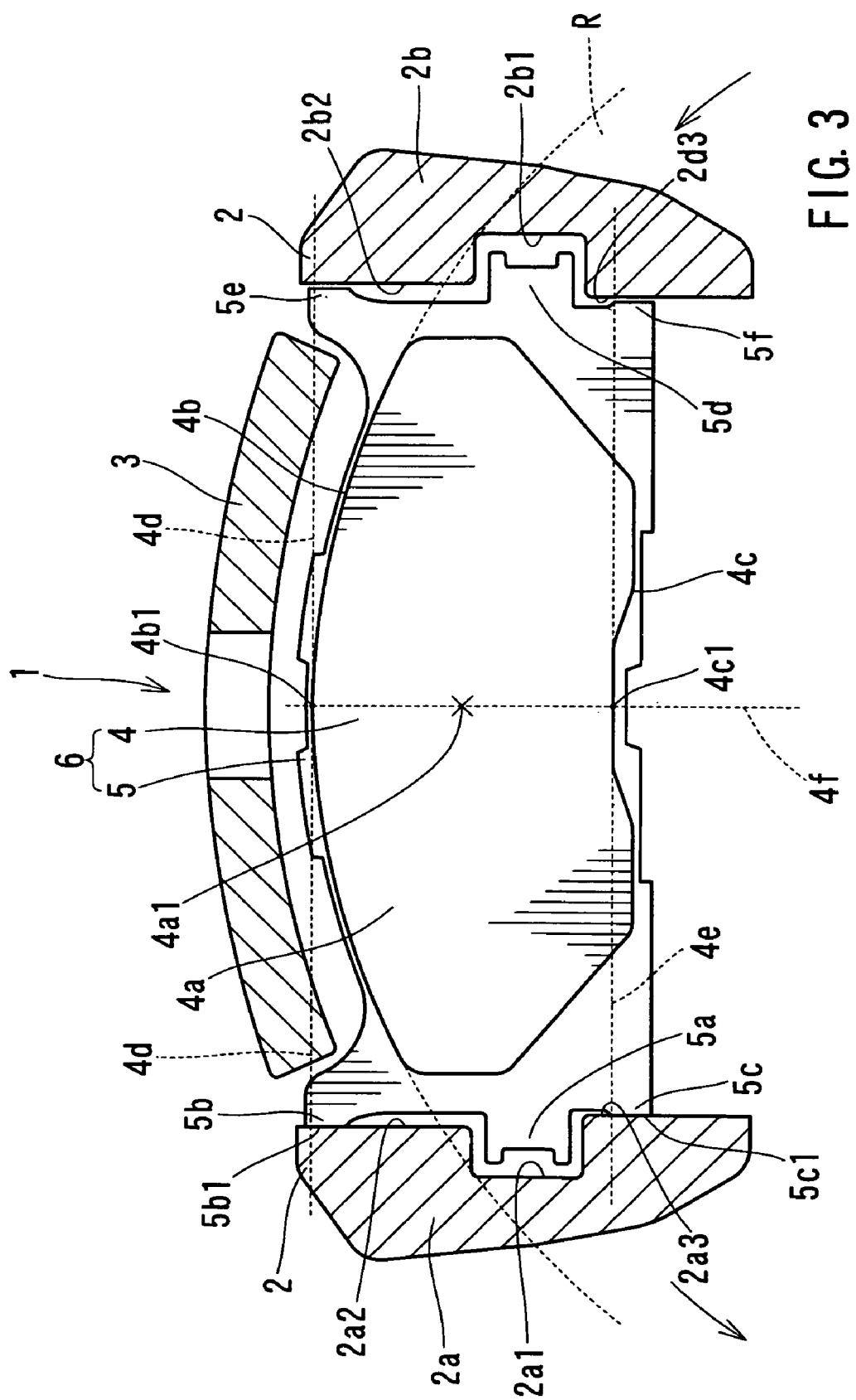
FIG. 3 is a cross-sectional view taken along line III-III in FIG. 2.

The support portions 2a1, 2b1 are formed to be concave-shaped as shown in FIG. 3 to permit insertion into of a guide portions 5a, 5d of the pad 6. The guide portions 5a is formed on a rotor rotation outlet side of the pad 6, and a guide portions 5d is formed on a rotor rotation inlet side on the pad 6. The support portions 2a1, 2b1 support the guide portions 5a, 5d in a manner to make the same movable in the axial direction of the rotor (a thickness-wise direction of the figure) and to prevent the same from coming off in a radial direction of the rotor (a vertical direction in FIG. 3).

The outer torque bearing surfaces 2a2, 2b2 are formed outwardly of the support portions 2a1, 2b1 in the radial direction of the rotor. On the other hand, the inner torque bearing surfaces 2a3, 2b3 are formed inwardly of the support portions 2a1, 2b1 in the radial direction of the rotor.

The pads 6 comprise a friction member 4 and a back plate member 5 as shown in FIGS. 2 and 3. The friction member 4 includes a substantially sector-shaped friction surface 4a on a front side thereof to generate a braking force upon sliding contact with the disk rotor R. The back plate member 5 is bounded on a back surface of the friction member 4.

The back plate member 5 is rectangular in shape as shown in FIG. 3. The back plate member 5 comprises guide portions 5a, 5d, outer push bearing portions 5b, 5e, and inner push bearing portions 5c, 5f, 5a, 5b, and 5c are each on a rotor rotation inlet side (a left side in FIG. 3). Further, 5d, 5e, and 5f are each on a rotor rotation outlet side (a right side in FIG. 3).

The guide portions 5a, 5d project toward the mount 2 from a center of both edges of the back plate member 5 in the circumferential direction of the rotor and extends in the support portions 2a1, 2b1.

The outer push bearing portions 5b, 5e project toward the mount 2 from the rotor rotation inlet side or the rotor rotation outlet side in positions outwardly of the guide portions 5a, 5d in the radial direction of the rotor as shown in FIG. 3.

The inner push bearing portions 5c, 5f project toward the mount 2 from the rotor rotation inlet side or the rotor rotation outlet side in positions radially inwardly of the guide portions 5a, 5d in the radial direction of the rotor.

The outer push bearing portion 5b includes a abutment surface 5b1 adapted to abut against the outer torque bearing surface 2a2 as shown in FIG. 3, the abutment surface 5b1 being formed in an outermost position of the back plate member 5 or close thereto in the radial direction of the rotor. More specifically, the abutment surface 5b1 is formed in a position on a tangent 4d to an outer peripheral side 4b in a central position 4b1 of the outer peripheral side 4b of the friction surface 4a outwardly in the radial direction of the rotor. Alternatively, the abutment surface 5b1 is formed in a position outwardly of the tangent 4d in the radial direction of the rotor.

The inner push bearing portion 5c includes an abutment surface 5c1 adapted to abut against the torque bearing surface 2a3 as shown in FIG. 3, the abutment surface 5c1 being formed on the edge of the back plate member 5 in a circumferential direction of the rotor to be positioned innermost in the radial direction of the rotor or close thereto. More specifically, the abutment surface 5c1 is formed in a position on a tangent 4e to an inner peripheral side 4c in a central position 4c1 of the inner peripheral side 4c of the friction surface 4a radially inwardly in the radial direction of the rotor. Alternatively, the abutment surface 5c1 is formed in a position radially inwardly of the tangent 4e in the radial direction of the rotor.

An explanation will be given below to movements of the pads 6, 6 when the pads 6, 6 are pushed against the disk rotor R.

In the case where the pads 6, 6 are pushed against the disk rotor R by the piston 10 or the pawls 3a, 3b (see FIG. 2), the pads 6, 6 are moved toward the rotor rotation outlet side (a left side in FIG. 3) from the rotor rotation inlet side (a right side in FIG. 3) by frictional forces generated between them and the disk rotor R.

Figure 4:
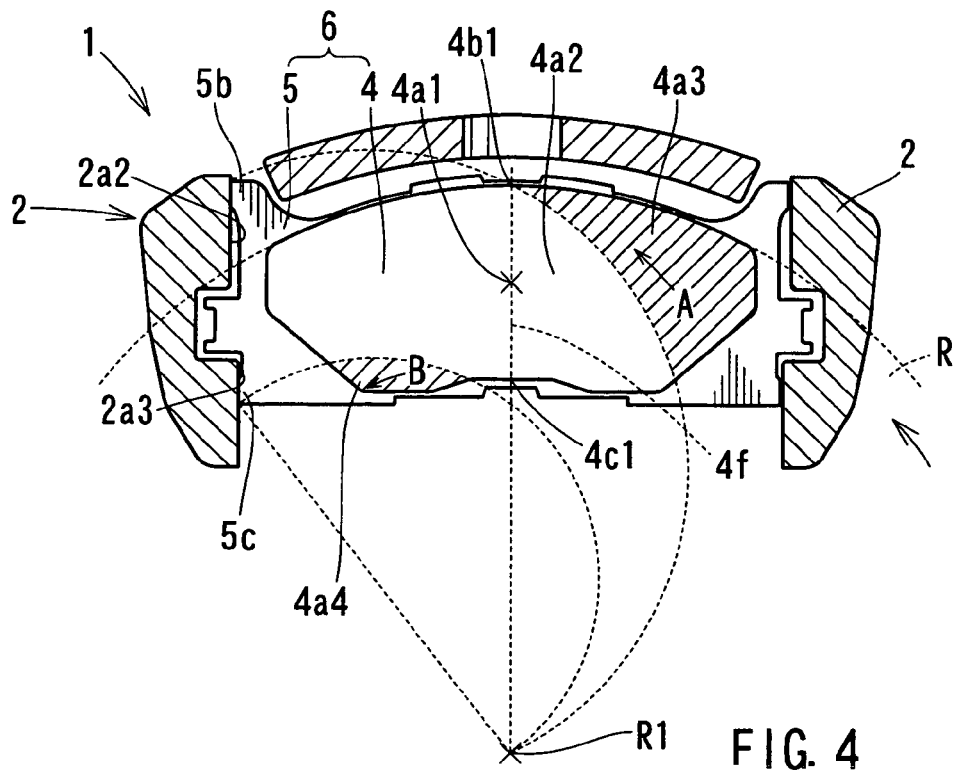
FIG. 4 is a cross-sectional view of the disk brake, to show the movement of the pad.

At this time, in the case where a center of the force to push the pad 6 toward the disk rotor R is positioned in a positive region 4a2 including a center 4a1 of the friction surface 4a as shown in FIG. 4, the pad 6 is moved substantially in parallel to the mount 2 toward the rotor rotation outlet side. The two push bearing portions 5b, 5c formed on the rotor rotation outlet side abut against the mounts 2. Therefore, the rotor rotation outlet side of the pad 6 abuts against the mount 2 at two points.

A portion of the positive region 4a2 is determined by a position of the outer push bearing portion 5b and a position of the inner push bearing portion 5c as shown in FIG. 4. That is, the positive region 4a2 is defined by a region of the friction surface 4a between a circle, a diameter of which is given by a line connecting between a center R1 of rotation of the disk rotor R and the outer push bearing portion 5b, and a circle, a diameter of which is given by a line connecting between the center R1 of rotation and the inner push bearing portion 5c.

According to the embodiment, the outer push bearing portion 5b is positioned outwardly in the radial direction of the rotor. Therefore, the positive region 4a2 occupies adequately large rotor rotation outlet side area. Since the inner push bearing portion 5c is positioned radially inwardly in the radial direction of the rotor, an area of the positive region 4a2 on the rotor rotation inlet side is adequately large.

In the case where the center of the force to push the pad 6 toward the disk rotor R is positioned in a + region 4a3 nearer to the rotor rotation inlet side than the positive region 4a2, a force in, for example, a direction indicated by an arrow A is applied on the pad 6 by a frictional force generated between the pad and the disk rotor R. Therefore, the pad 6 is moved in the direction of the arrow A and the outer push bearing portion 5b abuts against the mount 2. The pad 6 is rotated counterclockwise about the outer push bearing portion 5b and there occurs a coming-out phenomenon, in which the rotor rotation inlet side comes out outward in the radial direction of the rotor from the mount 2.

In the case where the center of the force to push the pad 6 toward the disk rotor R is positioned in a − region 4a4 nearer to the rotor rotation outlet side than the positive region 4a2, a force in, for example, a direction indicated by an arrow B is applied on the pad 6 by a frictional force generated between the pad and the disk rotor R. Therefore, the pad 6 is moved in the direction of the arrow B and the inner push bearing portion 5c abuts against the mount 2. The pad 6 is rotated clockwise about the inner push bearing portion 5c and there occurs a coming-out phenomenon, in which the rotor rotation inlet side extends out radially inwardly in the radial direction of the rotor from the mount 2.

With the disk brake 1 according to the embodiment, the + region 4a3 and the − region 4a4 are very small as shown in FIG. 4. For example, a pad 16 being a comparative example shown in FIG. 5 comprises an outer push bearing portion 15b and an inner push bearing portion 15c near a guide portion 15a. That is, the outer push bearing portion 15b is formed radially inwardly of a tangent 14d to an outer peripheral side 14b in a central position 14b1 of the outer peripheral side 14b of a friction surface 14a outwardly in the radial direction of the rotor. The inner push bearing portion 15c is formed outwardly of a tangent 14e in a central position 14c1 of an outer peripheral side 14c of the friction surface 14a radially outwardly in the radial direction of the rotor.

Figure 5:
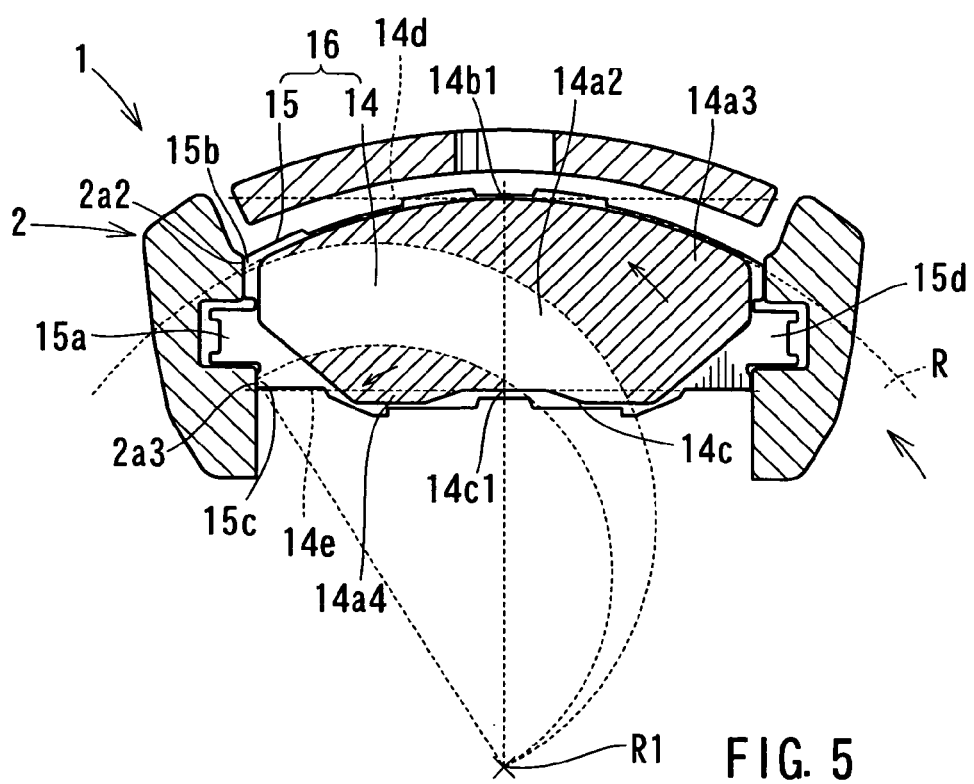
FIG. 5 is a cross-sectional view of a relative disk brake, to show the movement of a pad of the relative disk brake.

Accordingly, with the disk brake 1 according to the embodiment, as shown in FIG. 4, a positive region 4a2 is large and a + region 4a3 and a − region 4a4 are small as compared with the comparative example shown in FIG. 5. Therefore, a coming-out phenomenon of the pad 6 scarcely occurs.

Also, the disk brake 1 according to the embodiment is configured such that a line connecting between the central position 4b1 of the outer peripheral side 4b of the friction surface 4a outward in the radial direction of the rotor and the central position 4c1 of the outer peripheral side 4c radially inwardly in the radial direction of the rotor is completely included in the positive region 4a2.

Also, according to the embodiment, the pad 6 is short in width in the circumferential direction of the rotor as compared with conventional pads. Therefore, a ratio of the positive region 4a2 to the friction surface 4a in area is larger than the positive region 14a2 of conventional pads.

Also, a center of the force to push the pad 6 toward the disk rotor R tends to separate from the center 4a1 of the friction surface 4a in the case where the pad is lightly pushed at an initial stage of starting to push the pad. A position of the center of the force at this time can be adjusted by a shape of the pawls 3a, the piston 10, or the friction surface 4a of the pad 6. For example, by providing a notch on a tip end of the each pawl 3a or the piston 10, or chamfering the friction surface 4a of the pad 6, the center of the force to push the pad 6 toward the disk rotor R can be adjusted so as to be positioned in the positive region 4a2 at all times.

The disk brake 1 is formed in the above-mentioned manner. That is, the pad 6 comprises the two push bearing portions 5b, 5c on the rotor rotation outlet side to project toward the mount 2 as shown in FIG. 3. Therefore, the rotor rotation outlet side of the pad 6 is able to abut against the mount 2 at two points.

Besides, the outer push bearing portion 5b comprises the abutment surface 5b1 that abuts against the mount 2 on the tangent 4d in the central position 4b1 of the outer peripheral side 4b of the friction surface 4a outward in the radial direction of the rotor, or outwardly of the tangent 4d in the radial direction of the rotor. Accordingly, even in the case where the center of the force to push the pad 6 toward the disk rotor R is close to the edge of the pad 6 on the rotor rotation inlet side, inclination of the pad 6 relative to the mount 2 can be restricted by the outer push bearing portion 5b (see FIG. 4). Therefore, the pad 6 is able to abut against the mount 2 at two points on the disk rotor rotation outlet side.

Figure 6:
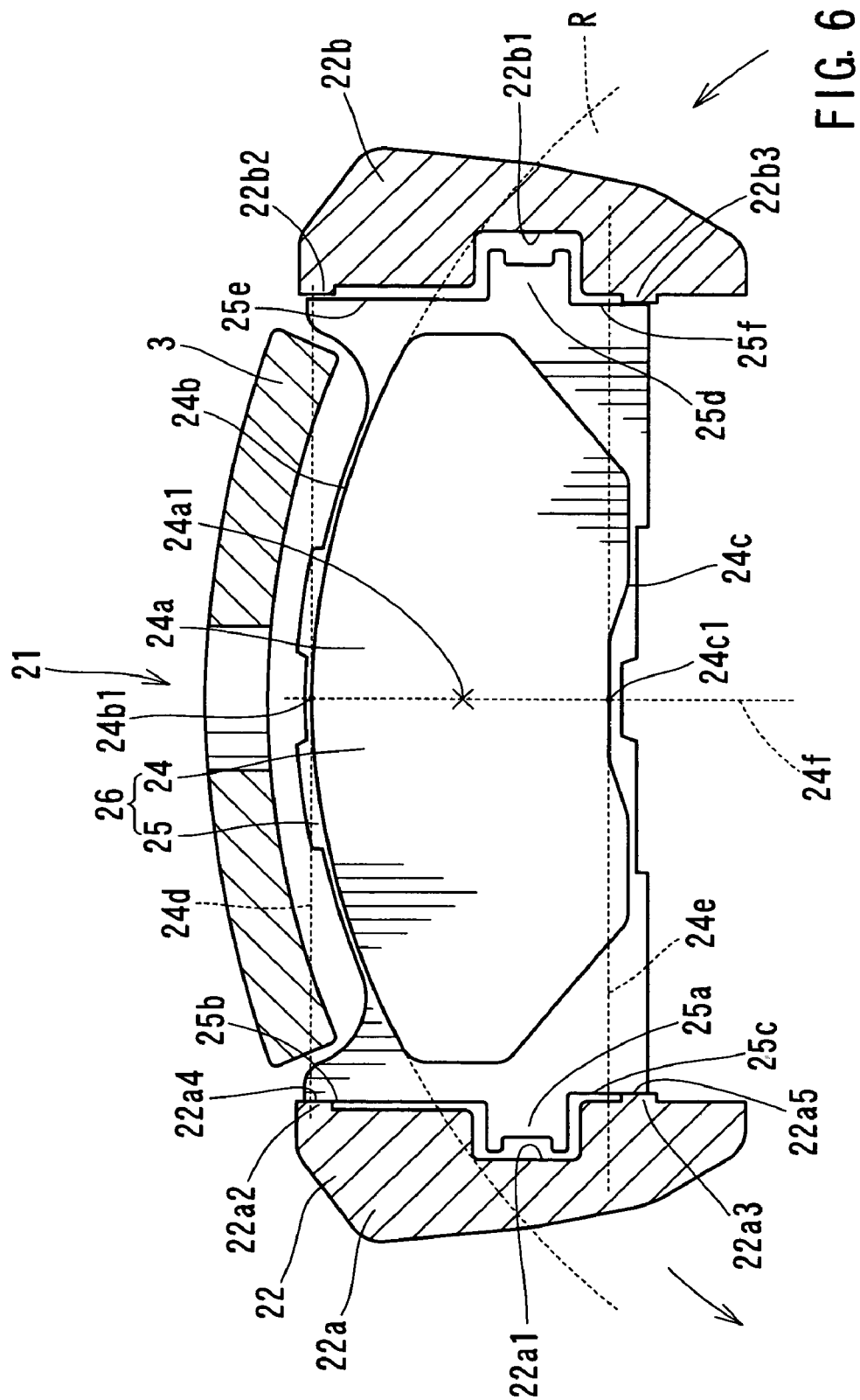
FIG. 6 is a cross-sectional view of a second representative embodiment of the present invention, similar to FIG. 3.

The second representative embodiment will now be described with reference to FIG. 6. A disk brake 31 according to the second representative embodiment is formed in substantially the same manner as the disk brake 1 according to the first embodiment. However, while the first embodiment comprises the push bearing portions 5b, 5c projecting toward the mount 2 from the pad 6 as shown in FIG. 3, the second representative embodiment comprises an outside projection 22a2 projecting toward a pad 26 from a mount 22 and an inside projection 22a3 as shown in FIG. 6. Subsequently, the second representative embodiment will be described centering on such differences.

The disk brake 21 according to the second representative embodiment includes a mount 22 and a pair of pads 26, 26. The respective pads 26 have a friction member 24 and a back plate member 25 as shown in FIG. 6.

The back plate member 25 includes, on a rotor rotation outlet side and on a rotor rotation inlet side respectively, guide portions 25a, 25d, outer push bearing portions 25b, 25e, and inner push bearing portions 25c, 25f.

The outer push bearing portions 25b, 25e are formed in positions outwardly of the guide portions 25a, 25d in the radial direction of the rotor, and the inner push bearing portions 25c, 25f are formed in positions radially inwardly of the guide portions 25a, 25d in the radial direction of the rotor.

The mount 22 comprises a pair of straddle portions 22a, 22b. A pair of outer torque receive portions extend from outer side edges of the straddle portions 22a, 22b, and a pair of inner torque receive portions extend from inner side edges of the straddle portions 22a, 22b. Each of the torque receiving portions includes support portion (22a1 or 22b1), outside projection (22a2 or 22b2), and inside projection (22a3 or 22b3). The support portions 22a1, 22b1 are formed to be concave-shaped.

The outside projections 22a2, 22b2 project further toward the back plate member 25 from outward positions in the radial direction of the rotor than the support portions 22a1, 22b1. The inside projections 22a3, 22b3 project further toward the back plate member 25 from radially inward positions in the radial direction of the rotor than the support portions 22a1, 22b1.

The outside projection 22a2 includes an abutment surface 22a4 adapted to abut against the push bearing portion 25b, the abutment surface 22a4 being formed on a tangent 24d to an outer peripheral side 24b in a central position 24b1 of an outer peripheral side 24b of a friction surface 24a of the friction member 24 outward in the radial direction of the rotor, or outwardly of the tangent 24d in the radial direction of the rotor.

The inside projection 22a3 includes an abutment surface 22a5 adapted to abut against the push bearing portion 25c. The abutment surface 22a5 is provided on a tangent 24e to an inner peripheral side 24c in a central position 24c1 of an inner peripheral side 24c of the friction surface 24a radially inwardly in the radial direction of the rotor, or inwardly of the tangent 24e in the radial direction of the rotor.

Accordingly, the torque receive portion of the mount 22 comprises the two projections 22a2, 22a3 projecting toward the rotor rotation outlet side of the pad 26. Therefore, the mount 22 is able to abut against the rotor rotation outlet side of the pad 26 at two points.

Besides, the outside projection 22a2 includes the abutment surface 22a4 that abuts against the pad 26 on the tangent 24d, or outwardly of the tangent 24d in the radial direction of the rotor. Accordingly, even in the case where a center of a force to push the pad 26 toward the disk rotor R is close to an edge of the pad 26 on the rotor rotation inlet side, inclination of the pad 26 relative to the mount 22 can be restricted by the outside projection 22a2. Therefore, the pad 26 is able to abut against the mount 22 at two points on the disk rotor rotation outlet side.

Also, the projection 22a3 includes an abutment surface that abuts against the pad 26 on the tangent 24e, or radially inwardly of the tangent 24d in the radial direction of the rotor. Accordingly, even in the case where a center of the force to push the pad 26 toward the disk rotor R is close to an edge of the pad 26 on the rotor rotation outlet side, inclination of the pad 26 relative to the mount 22 can be restricted by the inside projection 22a3. Therefore, the pad 26 is able to abut against the mount 22 at two points on the disk rotor rotation outlet side.

Figure 7:
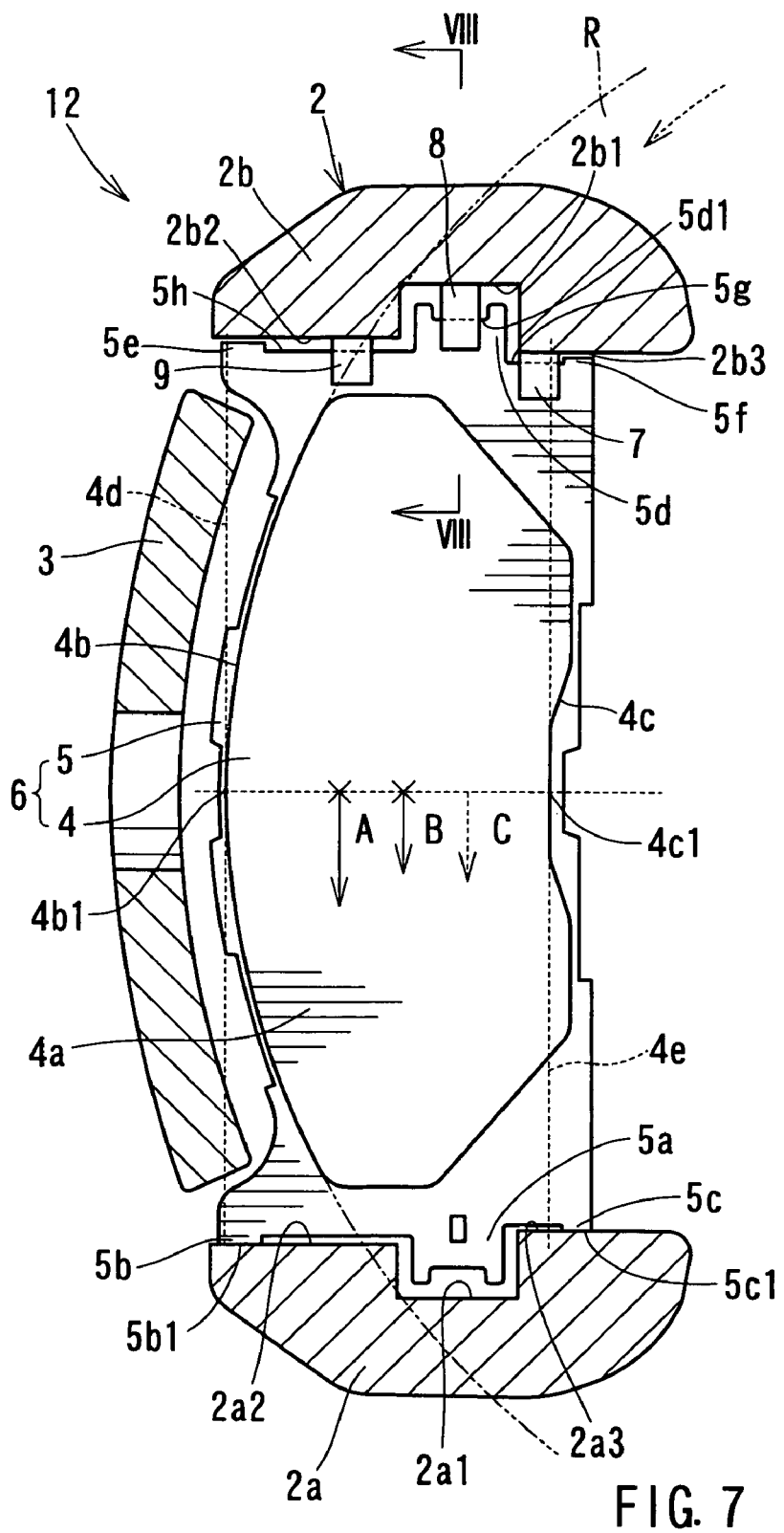
FIG. 7 is a cross-sectional view of a third representative embodiment of the present invention, similar to FIG. 3.

The third representative embodiment will now be described with reference to FIGS. 7 and 8. A disk brake 12 according to the third representative embodiment is formed in substantially the same manner as the disk brake 1 according to the first embodiment. However, The third representative embodiment is different from the first embodiment in comprising biasing members 7, 8, and 9 that bias a pad 6 as shown in FIG. 7. Subsequently, the third representative embodiment will be described centering on such differences.

The disk brake 12 is mounted on a vehicle front side of an rotor axis of the disk rotor R. Therefore, as shown in FIG. 7, the disk rotor R rotates downward from above the pad 6 at the time of forward travel of a vehicle. A rotor rotation inlet side (upper side) of the pad 26 is positioned above a rotor rotation outlet side (lower side) of the pad 26.

The biasing members 7, 8 and 9 that bias the pad 6 downward are provided between the rotor rotation inlet side and a torque receive portion of the mount 2 as shown in FIG. 7.

Figure 8:
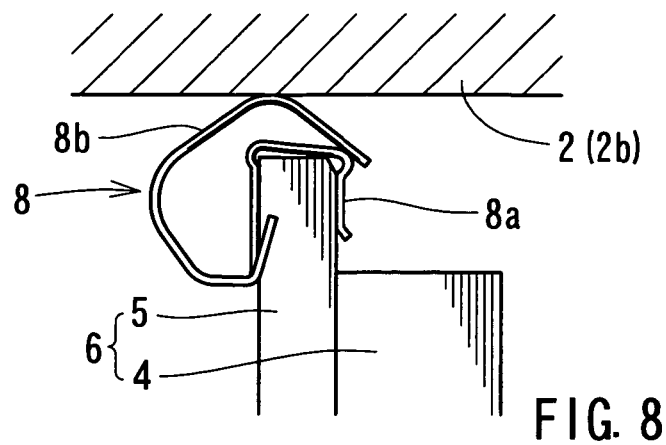
FIG. 8 is a cross-sectional view taken along line VIII-VIII in FIG. 7.

The biasing member 8 at a central position is a leaf spring member as shown in FIG. 8 and comprises a mount member 8a and an elastic member 8b. The mount member 8a is mounted to a recess 5d1 formed at a tip end of a guide portion 5d of a back plate member 5 as shown in FIG. 7. The elastic member 8b abuts elastically against the mount 2.

The biasing members 7 and 9 also include a mount member and an elastic member in an integral manner. The biasing member 7 is positioned inside and provided radially inwardly of the rotor rotation inlet side guide portion 5d in a radial direction of a rotor, and the mount thereof is connected to a recess 5g of the back plate 5 formed between an inner push bearing portion 5f and the guide portion 5d. The elastic member abuts elastically against the mount 2.

The biasing member 9 is positioned outside and provided outwardly of the rotor rotation inlet side guide portion 5d in the radial direction of the rotor, and the mount thereof is connected to a recess 5h of the back plate member 5 formed between an outer push bearing portion 5e and the guide portion 5d. The elastic member abuts elastically against the mount 2.

An explanation will be given below to a manner of the disk brake 1 in a non-braked state. A downward force caused by a tare weight of the pad is applied on the pad 6 in the non-braked state on a center B as shown in FIG. 7.

Also, the pad 6 in the non-braked state abuts against pawls 3a, 3a, which push the pad 6 toward the disk rotor R, or the piston 10. Therefore, a part of a tare weight of the caliper 3 is applied on the pad 6 through the pawls 3a, 3a and the piston 10. A center of the force is positioned at a point A outwardly of the center B in the radial direction of the rotor. Therefore, a downward force centering on the point A is also applied on the pad 6.

Also, the biasing members 7, 8 and 9 applies a downward force on the pad 6. The downward force by the biasing members 7, 8 and 9 is adjusted so as to be positioned at C radially inwardly of the center B in the radial direction of the rotor. The bias of the biasing members 7, 8 and 9 is adjusted taking account of the tare weight of the pad and the tare weight of the caliper so that the outer push bearing portion 5b and the inner push bearing portion 5c abut against the mount 2 at substantially the same magnitude.

When the pads 6, 6 are pushed against the disk rotor R to put the disk brake 1 in a braked state at the time of forward travel of a vehicle, the pads 6, 6 are exerted by a force toward the rotor rotation outlet side (a lower side in FIG. 3) from the rotor rotation inlet side (an upper side in FIG. 3). Thereby, the mount 2 applies a force on the outer push bearing portion 5b and the inner push bearing portion 5c. The outer push bearing portion 5b and the inner push bearing portion 5c continue to abut against the mount 2. Therefore, the pads 6 are neither moved nor inclined relative to the mounts 2.

In the case where the disk brake 1 is put in a braked state at the time of backward travel of a vehicle, the pads 6, 6 are moved by frictional forces generated between the pads and the disk rotor R. Then the biasing members 7, 8 and 9 are elastically deformed and the two push bearing portions 5e, 5f abut against the torque receive portion of the mount 2.

The third representative embodiment is formed in the manner described above. That is, the mount 2 is fixed to a vehicle so that the rotor rotation inlet side of the pad 6 is disposed above the rotor rotation outlet side as shown in FIG. 3. The biasing members 7, 8 and 9 are provided between the rotor rotation inlet side of the pad 6, which is disposed on the upper side, and the mount 2, and a center of bias on the pad by the biasing members 7, 8 and 9 is positioned radially inwardly of the center B of figure of the pad 6 in the radial direction of the rotor. The outer push bearing portion 5b of the pad 6 disposed on the lower side and formed on the rotor rotation outlet side and the inner push bearing portion 5c continue to abut against the mount 2 in a braked state and in a non-braked state at the time of forward travel of a vehicle.

Accordingly, the rotor rotation outlet side of the pad 6 is caused by the biasing members 7, 8 and 9 to continue to abut against the mount 2 at two points, on the outer push bearing portion 5b and the inner push bearing portion 5c in a non-braked state and in a braked state. Therefore, the pad 6 is moved minimally relative to the mount 2 during an interval from a non-braked state to a braked state, and braking noise is difficult to generate between the pad 6 and the mount 2.

Also, a part of a tare weight of the caliper 3 is applied on the pad 6 through the pawls 3a, etc. in a non-braked state. Generally, a center of the force is positioned outwardly of the center B of figure of the pad 6 in the radial direction of the rotor. Therefore, a downward force centering on an outward position in the radial direction of the rotor is applied on the pad 6.

In contrast, according to this embodiment, the biasing members 7, 8 and 9 are provided, and a center of bias by the biasing members 7, 8 and 9 is positioned radially inwardly of the center B of figure of the pad 6 in the radial direction of the rotor. Accordingly, the pad 6 abuts against the mount 2 in a well-balanced manner and is hard to be inclined relative to the mount 2 at an initial stage of braking. Therefore, braking noise is difficult to generate between the pad 6 and the mount 2.

Accordingly, the biasing member 7 in the inside position makes a center of bias by being positioned radially inwardly of the center B of the pad 6 in the radial direction of the rotor. Therefore, in contrast with configurations, which include all biasing members 7, 8 and 9, here a small bias makes it possible to have the pad 6 abutting against the mount 2 in a well-balanced manner. By reducing the overall bias of the biasing members 7, 8 and 9, the pad 6 easily moves. Consequently, the pad 6 is able to move against the bias of the biasing members 7, 8 and 9 in a braked state at the time of backward travel of a vehicle, so that a braking force becomes stable at the time of backward travel of a vehicle.

Also, an outer push bearing portion 5e is formed on the rotor rotation inlet side of the pad 6 for backward travel, and is positioned outwardly of the rotor rotation inlet side guide portion 5d in the radial direction of the rotor as shown in FIG. 7 to project toward the mount 2. Further, an inner push bearing portion 5f is formed on the outer peripheral edge of pad 6 for backward travel, and is positioned radially inwardly of the rotor rotation inlet side guide portion 5d in the radial direction of the rotor to project toward the mount 2. The biasing members 7 and 9 are provided on recesses 5g, 5h and are formed between the outer push bearing portion 5e and the inner push bearing portion 5f.

Accordingly, when the pad 6 is pushed against the disk rotor R to effect braking at the time of backward travel of a vehicle, the pad 6 is moved toward the torque receive portion of the mount 2 and the biasing members 7 and 9 are elastically deformed. Thus the biasing members 7 and 9 are received in the recesses and the pad 6 can abut against the mount 2 without being obstructed by the biasing members 7 and 9. Therefore, a braking force is increased at the time of backward travel of a vehicle.

The fourth representative embodiment will be described with reference to FIG. 9. A disk brake 31 according to the fourth representative embodiment is formed in substantially the same manner as the disk brake 12 according to the third representative embodiment. However, the disk brake 31 comprises a biasing member 32, shown in FIG. 9, in place of the biasing members 7, 9 shown in FIG. 7. Subsequently, The fourth representative embodiment will be described by centering on such differences.

Figure 9:
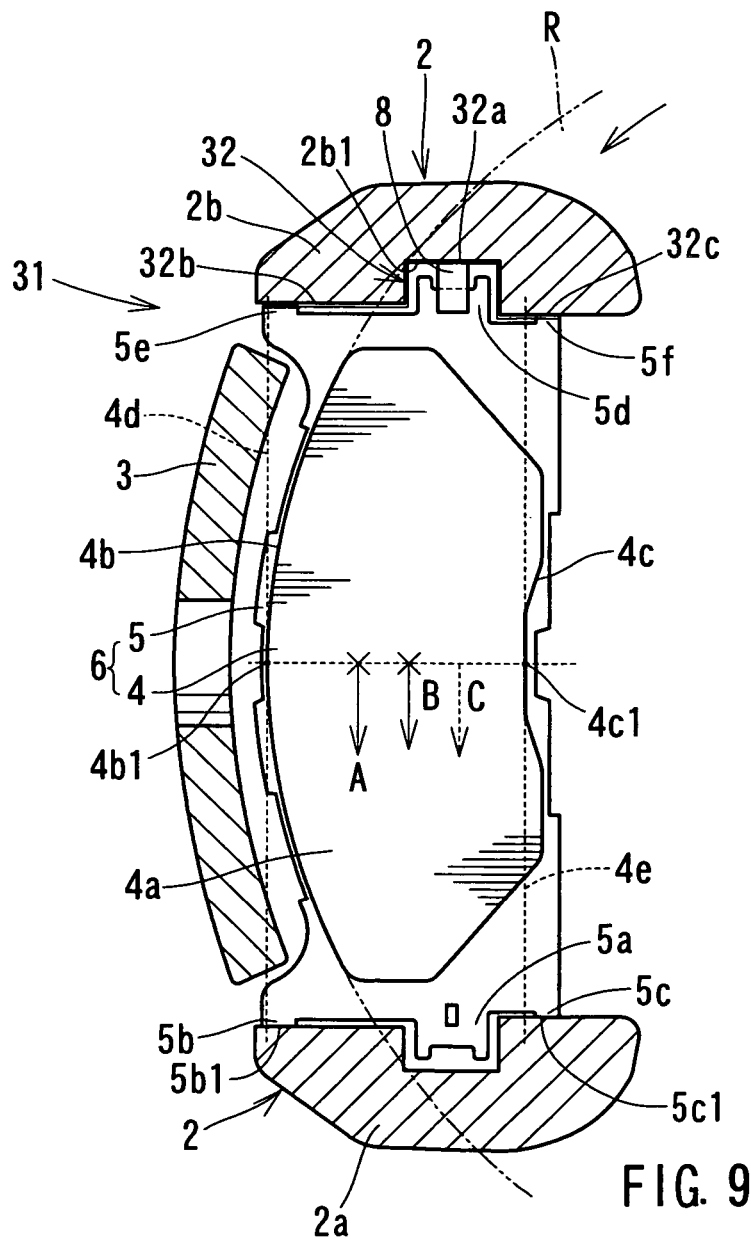
FIG. 9 is a cross-sectional view of a fourth representative embodiment of the present invention, similar to FIG. 3.

A biasing member 32 and a biasing member 8 are provided between a rotor rotation inlet side which defines an upper side of a pad 6 as shown in FIG. 9, and a torque receive portion of a mount 2. The biasing member 8 is mounted to a tip end of an rotor rotation inlet side guide portion 5d.

The biasing member 32 is preferably formed from a leaf spring material, and includes a projection 32a, an outer projecting member 32b, an inner projecting member 32c, and a mount (not shown) connected to the torque receive portion of the mount 2 in an integral manner.

The projection 32a is provided inside a support portion 2b1 of the mount 2. The outer projecting member 32b projects outward from an end of the projection 32a in a radial direction of disk rotor R to abut against an outer push bearing portion 5e of the pad 6 to elastically bias the outer push bearing portion 5e.

The inner projecting member 32c projects inward from the other end of the projection 32a in the radial direction of the rotor to abut against an inner push bearing portion 5f of the pad 6 to elastically bias the inner push bearing portion 5f.

Bias given by the outer projecting member 32b, the inner projecting member 32c, and the biasing member 8 is adjusted so as to be positioned at C radially inwardly of a center B of figure of the pad 6 in the radial direction of the rotor.

A part of a tare weight of the caliper 3 born at a point A, a tare weight of the pad 6 born at the center B of figure, and the biasing members 8 and 32 apply a downward force on the pad 6 in a non-braked state. The biasing members 8 and 32 cause the outer push bearing portion 5b and the inner push bearing portion 5c of the pad 6 to abut against the straddle portion 2a of the mount 2 at substantially the same magnitude.

The fifth representative embodiment will be described with reference to FIG. 10. A disk brake 34 according to the fifth representative embodiment is formed in substantially the same manner as the disk brake 12 according to the third representative embodiment. However, the disk brake 34 differs from the third representative embodiment in the way it is positioned and orientated relative to the vehicle. Also, the disk brake 34 comprises biasing members 37, 38 and 39, shown in FIG. 10, in place of the biasing members 7, 8 and 9 shown in FIG. 7. Subsequently, The fifth representative embodiment will be described by centering on such differences.

Figure 10:
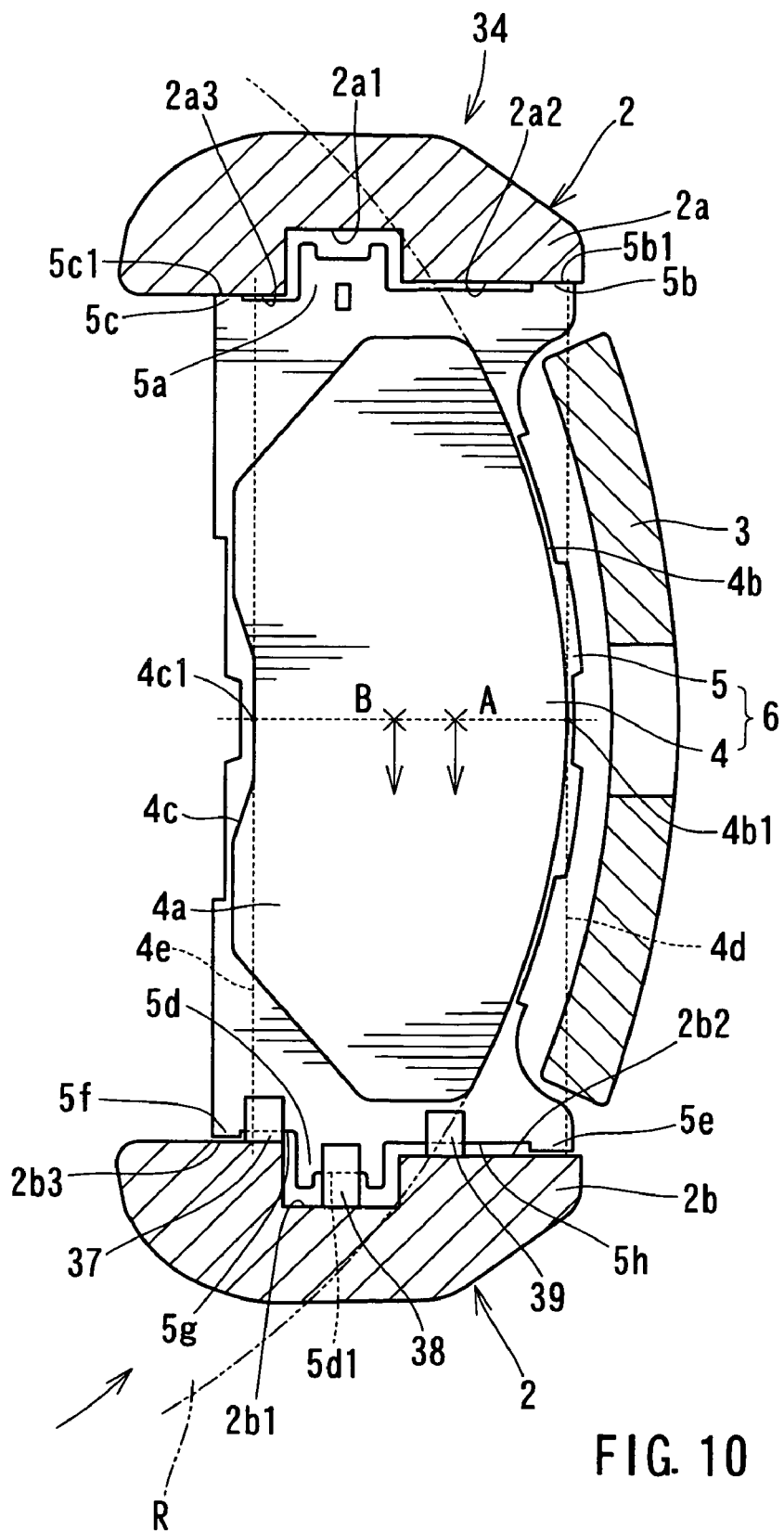
FIG. 10 is a cross-sectional view of a fifth representative embodiment of the present invention, similar to FIG. 3.

The disk brake 34 is mounted on a vehicle rear side of a rotor axis of the disk rotor R as shown in FIG. 10. Therefore, the disk rotor R rotates upward from below the pad 6 at the time of forward travel of a vehicle. The pad 6 comprises a rotor rotation inlet side in a lower part thereof and a rotor rotation outlet side in an upper part thereof.

The biasing members 37, 38 and 39 are provided between the rotor rotation inlet side which defines a lower side of the pad 6, and a torque receive portion of a mount 2. The biasing members 37, 38 and 39 are composed of a leaf spring material, and comprise a mount mounted to a back plate member 5, and an elastic piece, which elastically abuts against the torque receive portion of the mount 2, in an integral manner.

The biasing member 37 is positioned radially inward of an rotor rotation inlet side guide portion 5*d* in a radial direction of a rotor to be positioned inside, and the mount of which is mounted to a recess 5*g* of the back plate member 5.

The biasing member 39 is positioned outward of the rotor rotation inlet side guide portion 5*d* in the radial direction of the rotor to be positioned outside, and the mount of which is mounted to a recess 5*h* of the back plate member 5.

The biasing member 38 is centrally positioned and is mounted to a recess Sdl formed at a tip end of the rotor rotation inlet side guide portion 5*d*.

A downward force caused by a tare weight of the pad is applied on the pad 6 in a non-braked state on a center B. Also, a part of a tare weight of a caliper 3 is applied on the pad 6 through pawls of the caliper 3, etc. in a non-braked state. A center of the force is positioned at a point A outwardly of the center B in the radial direction of the rotor, and a downward force centering on the point A is applied on the pad 6.

On the other hand, the biasing members 37, 38 and 39 apply an upward bias on the pad 6. The bias by the biasing members 37, 38 and 39 is adjusted so as to center on a position outwardly of the center B in the radial direction of the rotor to bias the pad 6. The bias by the biasing members 37, 38 and 39 cause an outer push bearing portion 5*b* and an inner push bearing portion 5*c* of the pad 6 to abut against the straddle portion 2*b* of the mount 2 at substantially the same magnitude.

The fifth representative embodiment is formed in the manner described above. That is, the mount 2 is fixed to a vehicle so that the rotor rotation inlet side of the pad 6 is positioned below the rotor rotation outlet side as shown in FIG. 6. The biasing members 37, 38 and 39 that bias the pad 6 upward are provided between the rotor rotation inlet side of the pad 6 and the mount 2. The outer push bearing portion 5*b* of the pad 6 disposed on the upper side and formed on the rotor rotation outlet side and the inner push bearing portion 5*c* continue to abut against the mount 2 in a non-braked state and in a braked state.

Accordingly, the biasing members 37, 38 and 39 cause the rotor rotation outlet side of the pad 6 to continue to abut against the mount 2 at the two positions in a non-braked state and in a braked state. Therefore, the pad 6 is moved minimally relative to the mount 2 during an interval from a non-braked state to a braked state, and braking noise is difficult to generate on the pad 6 and the mount 2.

A part of a tare weight of a caliper 3 is applied on the pad 6 through pawls of the caliper 3, etc. in a non-braked state. A center of the force is positioned outward of the center B of figure of the pad 6 in the radial direction of the rotor. Therefore, a downward force centering on a position outwardly in the radial direction of the rotor is applied on the pad 6.

In contrast, a center of bias by the biasing members 37, 38 and 39 is positioned outward of the center B in the radial direction of the rotor. Accordingly, the pad abuts against the mount 2 in a well-balanced manner and is difficult to be inclined relative to the mount 2 at an initial stage of braking. Therefore, braking noise is difficult to generate between the pad 6 and the mount 2.

Accordingly, the biasing member 39 as positioned outward creates a center of bias of the center B in the radial direction of the rotor. Therefore, in contrast with configurations which includes all biasing members 37, 38 and 39, here a small bias makes it possible to have the pad 6 abutting against the mount 2 in a well-balanced manner. By reducing the overall bias of the biasing members 37, 38 and 39, the pad 6 easily moves. Consequently, the pad 6 is able to move against the bias of the biasing members in a braked state at the time of backward travel of a vehicle, so that a braking force becomes stable at the time of backward travel of a vehicle.

Figure 11:
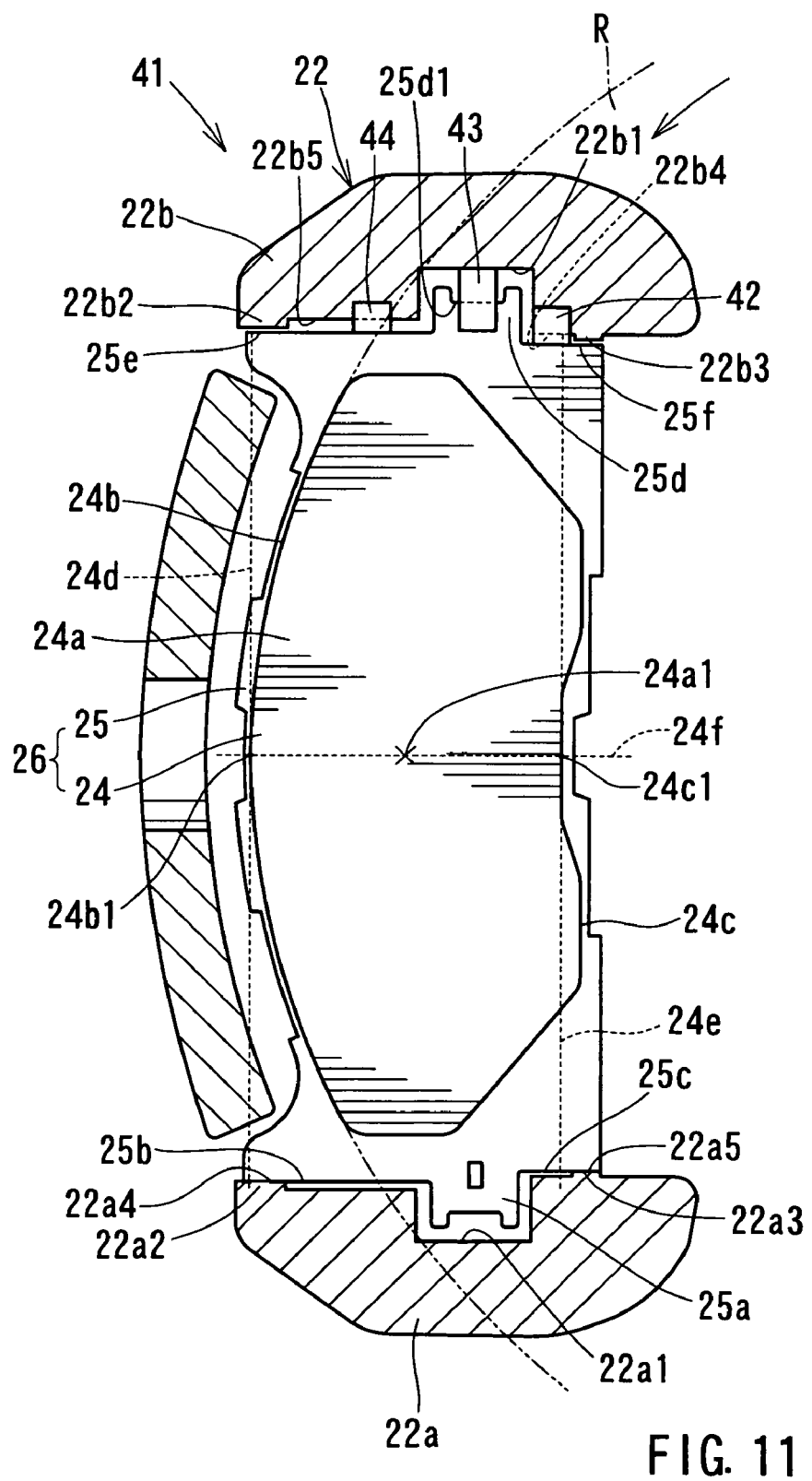
FIG. 11 is a cross-sectional view of a sixth representative embodiment of the present invention, similar to FIG. 3.

The sixth representative embodiment will be described with reference to FIG. 11. The sixth representative embodiment is formed in substantially the same manner as the second representative embodiment. However, the sixth representative embodiment differs from the second representative embodiment by including biasing members 42, 43 and 44 that bias a pad 26 as shown in FIG. 11. Subsequently, the sixth representative embodiment will be described by centering on such differences.

A disk brake 41 includes a mount 22 and a pair of pads 26, 26. The biasing members 42, 43 and 44 that bias the pad 26 downward are provided between a rotor rotation inlet side (upper side) of the pad 26 and a torque receive portion of a mount 22.

The biasing member 42 comprises a mount (connected to a recess 22*b*4) and an elastic member in an integral manner. The recess 22*b*4 is formed between an inside projecting 22*b*3 and a support portion 22*b*1 of the mount 22. The elastic member of the biasing member 42 elastically abuts against the rotor rotation inlet side of the pad 26.

The biasing member 44 comprises a mount (connected to a recess 22*b*5) and an elastic member in an integral manner. The recess 22*b*5 is formed between an outside projecting 22*b*2 and a support portion 22*b*1 of the mount 22. The elastic member of the biasing member 44 elastically abuts against the rotor rotation inlet side of the pad 26.

The biasing member 43 comprises a mount (connected to a recess 25*d*1) and an elastic member in an integral manner. The recess 25*d*1 is formed at a tip end of an rotor rotation inlet side guide portion 25*d*. The elastic member of the biasing member 43 elastically abuts against the mount 22.

At the time of non-braking, a rotor rotation outlet side of the pad 26 abuts against an outside projection 22*a*2 and an inside projection 22*a*3 of the mount 22. The biasing members 42, 43 and 44 cause the outside projection 22*a*2 and the inside projection 22*a*3 to abut against the torque receive portion of the mount 22 with forces of substantially the same magnitude.

The sixth representative embodiment is formed in the manner as described above, similar to other embodiments. That is, the biasing members 42 and 44 are provided on the recesses 22*b*4, 22*b*5 of the mount 22.

Accordingly, when the pad 26 is pushed against the disk rotor R to effect braking at the time of backward travel of a vehicle, the pad 26 is moved upward and the biasing members 42, 43 and 44 are elastically deformed. Thus the biasing members 42, 43 and 44 are received in the recesses 22b4, 22b5 and the pad 26 can abut against the mount 22 without being obstructed by the biasing members 42, 43 and 44. As a result, the braking force is improved at the time of backward travel of a vehicle.

The seventh representative embodiment will be described with reference to FIG. 12. A disk brake 45 according to the seventh representative embodiment is formed in substantially the same manner as the disk brake 42 according to the sixth representative embodiment. However, the disk brake 45 differs from the sixth representative embodiment in the way that it is positioned and orientated relative to the vehicle. Also, the disk brake 45 includes biasing members 46, 47 and 48, shown in FIG. 12, in place of the biasing members 42, 43 and 44 shown in FIG. 11. Subsequently, the seventh representative embodiment will be described by centering on such differences.

Figure 12:
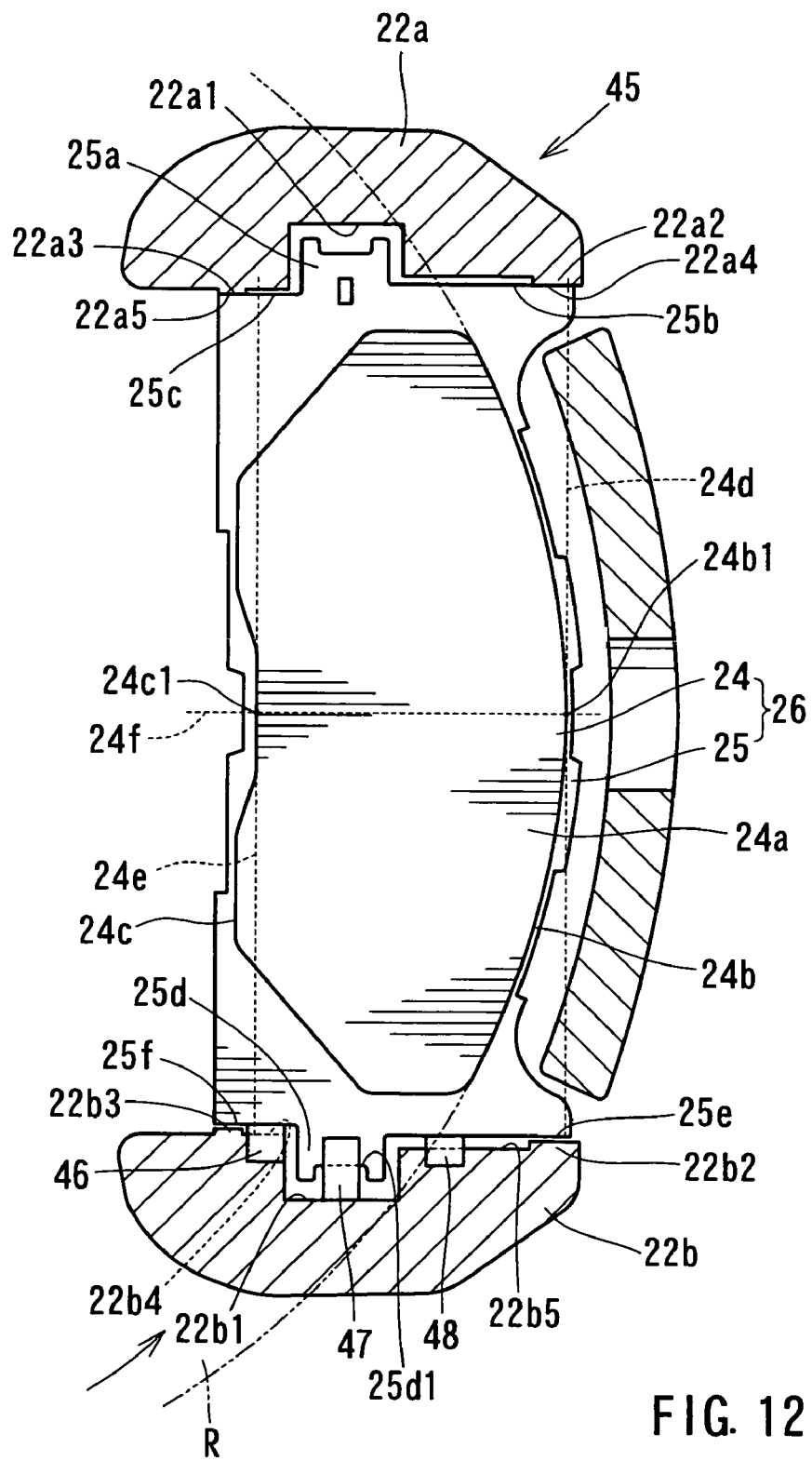
FIG. 12 is a cross-sectional view of a seventh representative embodiment of the present invention, similar to FIG. 3.

The disk brake 45 is mounted on a vehicle rear side of a rotor axis of a disk rotor R as shown in FIG. 12. Therefore, the disk rotor R rotates upward from below the pad 6 at the time of forward travel of a vehicle. The pad 26 comprises a rotor rotation inlet side in a lower part thereof and a rotor rotation outlet side in an upper part thereof.

The biasing members 46, 47 and 48 are positioned between the rotor rotation inlet side which defines a lower side of the pad 26, and a torque receive portion of a mount 22. The biasing members 46, 47 and 48 are composed of a leaf spring member, and comprise a mount (connected to a back plate 25), and an elastic member in an integral manner. The elastic member(s) of the biasing members 46, 47 and 48 elastically abut against the torque receive portion of the mount 22.

The biasing member 46 includes a mount (connected to a recess 22b4) and an elastic member in an integral manner. The recess 22b4 is formed between an inside projecting 22b3 and a support portion 22b1 of the mount 22. The elastic member of the biasing member 46 elastically abuts against the rotor rotation inlet side of the pad 26.

The biasing member 48 includes a mount (connected to a recess 22b5) and an elastic member in an integral manner. The recess 22b5 is formed between an outside projecting 22b2 and a support portion 22b1 of the mount 22. The elastic member of the biasing member 48 elastically abuts against the rotor rotation inlet side of the pad 26.

The biasing member 47 includes a mount (connected to a recess 25d1) and an elastic member in an integral manner. The recess 25d1 is formed at a tip end of an rotor rotation inlet side guide portion 25d. The elastic member of the biasing member 47 elastically abuts against the mount 22.

At the time of non-braking, a rotor rotation outlet side of the pad 26 abuts against an outside projection 22a2 and an inside projection 22a3 of the mount 22. The biasing members 46, 47 and 48 cause push bearing portions 25b, 25c of the rotor rotation outlet side of the pad 26 to abut against the torque receive portion of the mount 22 with forces of substantially the same magnitude.

While the invention has been described with reference to specific embodiments, it will be apparent to those skilled in the art that many alternatives, modifications and variations may be made. Accordingly, the present invention is intended to embrace all such alternatives, modifications and variations that may fall within the spirit and scope of the appended claims. For example, the present invention should not be limited to the first through seventh representative embodiments, but may be modified as described below.

(1) That is, a configuration, in which the mount according to the first, second and fifth representative embodiments is formed with the outside projection and the inside projection according to the second, sixth and seventh representative embodiments.

(2) The disk brake according to the third representative embodiment comprises the biasing members 7, 8 and 9 as shown in FIG. 7. However, a disk brake suffices to comprise the biasing member 7 positioned inside. Therefore the disk brake may be configured not to comprise one or both of the biasing member 9 positioned outside and the biasing member 8 positioned centrally. Or the disk brake may be configured to comprise other biasing members.

(3) The disk brake according to the fourth representative comprises the biasing member 8 and the biasing member 32 as shown in FIG. 9, and the biasing member 32 comprises the projecting members 32b, 32c. However, a disk brake suffices to comprise the projecting member 32c of the biasing member 32. Therefore the disk brake may be configured not to comprise one or both of the projecting member 32b and the biasing member 8. Or the disk brake may be configured to comprise other biasing members.

(4) The disk brake according to the fifth representative comprises the biasing members 37, 38 and 39 as shown in FIG. 10. However, a disk brake suffices to comprise the biasing member 39 positioned outside. Therefore the disk brake may be configured not to comprise one or both of the biasing member 37 positioned inside and the biasing member 38 positioned centrally. Or the disk brake may be configured to comprise other biasing members.

(5) The disk brake according to the sixth representative embodiment comprises the biasing members 42, 43 and 44 as shown in FIG. 11. However, a disk brake suffices to comprise the biasing member 42 positioned inside. Therefore the disk brake may be configured not to comprise one or both of the biasing member 44 positioned outside and the biasing member 43 positioned centrally. Or the disk brake may be configured to comprise other biasing members.

(6) The biasing members 37 and 39 according to the fifth representative are mounted in the recesses 5g and 5h provided on the back plate member 5 as shown in FIG. 6. However, a configuration, in which recesses are provided on the mount and the biasing members are mounted in the recesses, is contemplated.

(7) Any of the biasing members aforementioned may be formed integral with back plate member 5.

The invention claimed is:
1. A disk brake comprising:
  a mount having a support portion:
  a pad having a guide portion and an inner and outer push bearing portion on a peripheral surface of the pad;
  at least one biasing member positioned between a rotor rotation inlet side of the pad and the mount;
  wherein the guide portion of the pad is supported by the support portion of the mount;
  wherein the rotor rotation inlet side of the pad is positioned above a rotor rotation outlet side of the pad;
  wherein the inner and outer push bearing portion project toward the mount to abut against the mount when the pad is moved;
  a center of bias on the pad by the at least one biasing member, the center of bias positioned radially inward of a center of the pad; and wherein the inner push bearing portion of the pad and the outer push bearing portion of the pad abut against the mount in a braked state and in a non-braked state.

2. The disk brake as in claim 1, wherein the outer push bearing portion of the pad is positioned on a tangent to a central position of the outer peripheral side of a friction member of the pad.

3. The disk brake as in claim 1, wherein the outer push bearing portion of the pad is positioned radially outward of a tangent in a central position of the outer peripheral side of a friction member of the pad.

4. The disk brake as in claim 1, wherein the inner push bearing portion of the pad is positioned on a tangent in a central position of an inner peripheral side of a friction member of the pad.

5. The disk brake as in claim 1, wherein the inner push bearing portion of the pad is positioned radially inward of a tangent in a central position of an inner peripheral side of a friction member of the pad.

6. The disk brake as in claim 1, wherein the inner and outer push bearing portion positioned on either side of the support portion.

7. A disk brake comprising:
a mount having a support portion;
a pad having a guide portion on an outer peripheral edge, the guide portion supported by the support portion of the mount;
wherein the mount includes an inside and outside projection, the inside and outside projection positioned on either side of the support portion;
wherein the outside projection of the mount is positioned on a tangent in a central position of the outer peripheral side of a friction member of the pad; and
wherein the inside and outside projection extend toward the pad to abut against the pad when the pad is moved.

8. The disk brake as in claim 7, wherein the inside projection of the mount is positioned on a tangent in a central position of an inner peripheral side of a friction member of the pad.

9. The disk brake as in claim 7, further including:
at least one biasing member, provided to bias the pad downward, positioned between the pad and the mount; and
a center of bias on the pad by the at least one biasing member, the center of bias positioned radially inward of a center of the pad.

10. The disk brake as in claim 7, further including:
at least one biasing member, provided to bias the pad upward, positioned between the pad and the mount; and
a center of bias on the pad by the at least one biasing member, the center of bias positioned radially outward of a center of the pad.

11. A disk brake comprising:
a mount having a support portion;
a pad having a guide portion and an inner and outer push bearing portion on a peripheral surface of the pad;
at least one biasing member positioned between a rotor rotation inlet side of the pad and the mount;
wherein the guide portion of the pad is supported by the support portion of the mount;
wherein the rotor rotation inlet side of the pad is positioned below a rotor rotation outlet side of the pad;
wherein the inner and outer push bearing portion project toward the mount to abut against the mount when the pad is moved;
a center of the bias on the pad by the at least one biasing member, the center of bias is positioned radially outward of a center of the pad; and
wherein the inner push bearing portion of the pad and the outer push bearing portion of the pad abut against the mount in a braked state and in a non-braked state.

12. The disk brake as in claim 11, wherein the outer push bearing portion of the pad is positioned on a tangent to a central position of the outer peripheral side of a friction member of the pad.

13. The disk brake as in claim 11, wherein the outer push bearing portion of the pad is positioned radially outward of a tangent in a central position of the outer peripheral side of a friction member of the pad.

14. The disk brake as in claim 11, wherein the inner push bearing portion of the pad is positioned on a tangent in a central position of an inner peripheral side of a friction member of the pad.

15. The disk brake as in claim 11, wherein the inner push bearing portion of the pad is positioned radially inward of a tangent in a central position of an inner peripheral side of a friction member of the pad.

16. The disk brake as in claim 11, wherein the inner and outer push bearing portion positioned on either side of the support portion.

\* \* \* \* \*